(12) United States Patent
Tsuruta et al.

(10) Patent No.: US 6,209,217 B1
(45) Date of Patent: Apr. 3, 2001

(54) SURFACE-FOLLOWING TYPE MEASURING MACHINE

(75) Inventors: Atsushi Tsuruta; Shuuzou Ueno, both of Kure (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/378,998

(22) Filed: Aug. 23, 1999

(30) Foreign Application Priority Data

Sep. 30, 1998 (JP) .................................................. 10-277851

(51) Int. Cl.$^7$ ................................ G01B 7/34; G01B 7/28
(52) U.S. Cl. .................................. 33/554; 33/551; 33/555; 702/168
(58) Field of Search .............................. 33/554, 533, 549, 33/551, 553, 555, 556, 557, 559, 560; 702/167, 168

(56) References Cited

U.S. PATENT DOCUMENTS

| | | | |
|---|---|---|---|
| 4,166,323 | * | 9/1979 | Maag ........................................ 33/551 |
| 4,377,911 | * | 3/1983 | Iida et al. ................................. 33/551 |
| 4,669,300 | * | 6/1987 | Hall et al. ............................... 33/551 |
| 5,146,690 | * | 9/1992 | Breitmeier ............................. 33/551 |

FOREIGN PATENT DOCUMENTS 5-332859    12/1993  (JP) .
6-147894    5/1994   (JP) .

* cited by examiner

Primary Examiner—Christopher W. Fulton
(74) Attorney, Agent, or Firm—Oliff & Berridge, PLC

(57) ABSTRACT

A surface-following type measuring machine is provided, which is capable of setting the measuring force to a proper value in an efficient and accurate manner without imposing a burden on the operator in exchanging at least one of the stylus and stylus holder according to the surface contour of an object to be measured. A main body is disposed for movement relative to an object to be measured. A measuring arm is supported by the main body for displacement relative thereto, and carries at one end thereof a stylus holder and a stylus in a manner permitting replacement of the stylus holder and the stylus. Displacement of the measuring arm is detected by a displacement detecting device. The measuring force acting upon the measuring arm is adjusted by a measuring force adjusting device. A memory stores a measuring force command value table having a plurality of command values of the measuring force corresponding respectively to combinations of plural kinds of the stylus holder and plural kinds of the stylus. A kind of the stylus holder and a kind of the stylus after replacement of at least one of the stylus holder and the stylus are designated by an input device. A controller reads a command value of the measuring force corresponding to a combination of the kind of the stylus holder and the kind of the stylus after replacement, which are designated, and delivers the read command value of the measuring force to the measuring force adjusting device.

6 Claims, 6 Drawing Sheets

FIG.8

| STYLUS HOLDER | STYLUS | MEASURING DIRECTION | INCLINATION ANGLE | COMMAND VALUE |
|---|---|---|---|---|
| H1 | S1 | UPWARD | 0° | α1 |
| | | | 15° | α2 |
| | | | 30° | α3 |
| | | | 45° | α4 |
| | | | 60° | α5 |
| | | | 75° | α6 |
| | | DOWNWARD | 0° | α7 |
| | | | 15° | α8 |
| | | | 30° | α9 |
| | | | 45° | α10 |
| | | | 60° | α11 |
| | | | 75° | α12 |
| | S2 | UPWARD | 0° | α13 |
| | | | 15° | . |
| | | | 30° | . |
| | | | 45° | . |
| | | | 60° | . |
| H2 | S2 | | 0° | . |
| | | DOWNWARD | 15° | . |
| | | | 30° | . |
| | | | 45° | . |
| | | | 60° | . |
| | | | 75° | . |
| | S3 | UPWARD | 0° | . |
| | | | 15° | . |
| | | | 30° | . |
| | | | 45° | . |
| | | | 60° | . |
| | | | 75° | . |
| | | DOWNWARD | 0° | . |
| | | | 15° | . |
| | | | 30° | . |
| | | | 45° | . |
| | | | 60° | . |
| | | | 75° | . |

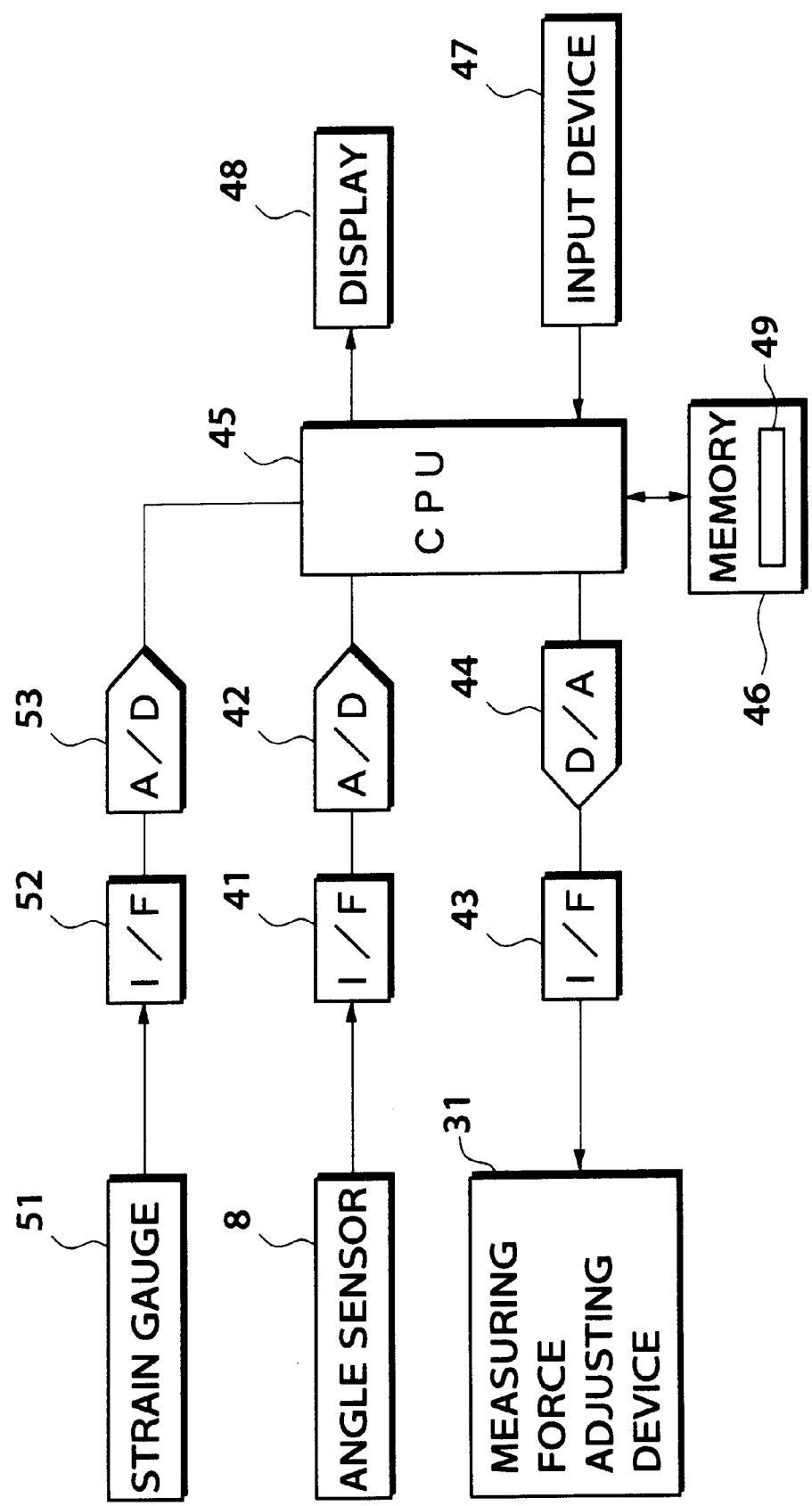

SURFACE-FOLLOWING TYPE MEASURING MACHINE

BACKGROUND OF THE INVENTION

1. Field of the Invention

The present invention relates to a surface-following type measuring machine, and more particularly to a surface-following type measuring machine which measures the surface roughness or contour of an object with a stylus thereof disposed in contact with the surface of the workpiece such that one of the stylus and the workpiece is moved relative to the other.

2. Prior Art

Surface roughness or contour measuring machines are known, which measure the surface roughness or contour of an object.

Measuring machines of this kind include a contact measuring machine having a contact-type stylus as shown in FIG. 1, which is equipped with a detector 5 comprised of a frame 10 which is moved relative to an object to be measured, by a moving mechanism, not shown, a measuring arm 11 supported via a shaft 12 by the frame 10 for swinging about the shaft 12 and carrying a stylus 15 at its tip, a balance weight 16 movably fitted on the measuring arm 11, for adjusting a measuring force acting upon the measuring arm 11, i.e. the force of contact of the stylus 15 with the object, such that the stylus 15 contacts the surface of an object to be measured with a predetermined measuring force, and a displacement detecting device 21 formed of a differential transformer or the like, for detecting an amount of displacement of the measuring arm 11 during swinging.

The measuring arm 11 is adapted to carry various types of styluses 15 and stylus holders 14 holding the stylus 15 such that the stylus 15 and the stylus holder 14 can be replaced with other ones, so as to be able to follow various surface contours of objects to be measured.

In measuring, a stylus 15 and a stylus holder 14 which are suitable for the surface contour of an object to be measured are selected and mounted on the measuring arm 11. The stylus 15 of the measuring arm 11 is brought into contact with the surface of the object, and then the measuring arm 11 is moved along the surface of the object by the moving mechanism. The measuring arm 11 swings according to the surface contour of the object, whereby the amount of displacement of the measuring arm 11 during swinging is detected by the displacement detecting device 21. The surface contour of the object or the like can be determined from the detected amount of displacement of the measuring arm 11 during swinging and the amount of movement of the same.

According to the conventional surface roughness or contour measuring machine, each time the stylus 15 and the stylus holder 14 are replaced with other ones, the balance weight 16 is adjusted, that is, the position of the balance weight 16 is moved in the longitudinal direction of the measuring arm 11, using a tension gauge or an electronic scale, such that the force of contact of the stylus 15 with the object to be measured, i.e. the measuring force, becomes equal to a predetermined value. This adjusting operation causes degraded operation efficiency and forms a great burden on the operator.

SUMMARY OF THE INVENTION

It is therefore an object of the present invention to provide a surface-following type measuring machine which is capable of setting the measuring force to a proper value in an efficient and accurate manner without imposing a burden on the operator in exchanging at least one of the stylus and stylus holder according to the surface contour of an object to be measured.

To attain the above object, the present invention provides a surface-following type measuring machine comprising a main body disposed for movement relative to an object to be measured, a measuring arm supported by the main body for displacement relative thereto, the measuring arm carrying at one end thereof a stylus holder and a stylus in a manner permitting replacement of the stylus holder and the stylus, displacement detecting means for detecting displacement of the measuring arm, measuring force adjusting means for adjusting a measuring force acting upon the measuring arm, storage means storing a measuring force command value table having a plurality of command values of the measuring force corresponding respectively to combinations of plural kinds of the stylus holder and plural kinds of the stylus, designating means for designating a kind of the stylus holder and a kind of the stylus after replacement of at least one of the stylus holder and the stylus, and control means for reading a command value of the measuring force corresponding to a combination of the kind of the stylus holder and the kind of the stylus after replacement designated by the designating means, and delivering the read command value of the measuring force to the measuring force adjusting means.

With the above arrangement, when the main body and the object to be measured are moved relative to each other with the stylus of the measuring arm disposed in contact with the surface of the object, the stylus of the measuring arm is displaced while following the surface of the object, and accordingly the measuring arm is displaced according to the surface roughness or contour of the object. The displacement of the measuring arm is detected by the displacement detecting means, and from the detected displacement value the surface roughness or contour of the object is determined.

When at least one of the stylus holder and stylus of the measuring arm is replaced with another kind of stylus holder and/or another kind of stylus according to the surface contour of the object to be measured, and the kind of stylus holder and/or the kind of stylus after the replacement is designated by the designating means, a command value of the measuring force corresponding to the combination of the kind of stylus holder and the kind of stylus designated by the designating means is read from the measuring force command value table, and the read command value of the measuring force is delivered to the measuring force adjusting means, which in turn controls the measuring force acting upon the measuring arm to a value corresponding to the read command value. As a result, the measuring force can be set to a proper value in an efficient and accurate manner without imposing a burden on the operator.

To attain the object, the present invention further provides a surface-following type measuring machine comprising a main body disposed for movement relative to an object to be measured, a measuring arm supported by the main body for displacement relative thereto, the measuring arm carrying at one end thereof a stylus holder and a stylus in a manner permitting replacement of the stylus holder and the stylus, displacement detecting means for detecting displacement of the measuring arm, measuring force adjusting means for adjusting a measuring force acting upon the measuring arm, storage means storing a measuring force command value table having a plurality of command values of the measuring force corresponding respectively to combinations of plural kinds of the stylus holder, plural kinds of the stylus, measuring directions in which the objected is to be measured, and angles of inclination of the main body, angle detecting means for detecting an angle of inclination of the main body, designating means for designating a kind of the stylus holder and a kind of the stylus after replacement of at least one of the stylus holder and the stylus, and for designating a measuring direction in which the objected is to be measured, and control means for reading a command value of the measuring force corresponding to a combination of the kind of the stylus holder and the kind of the stylus after replacement designated by the designating means, the measuring direction designated by the designating means, and the angle of inclination of the main body detected by the angle detecting means, and delivering the read command value of the measuring force to the measuring force adjusting means.

With the above arrangement, the measuring force command value table has a plurality of command values of the measuring force corresponding respectively to combinations of plural kinds of the stylus holder, plural kinds of the stylus, measuring directions in which the objected is to be measured, and angles of inclination of the main body. That is, optimal measuring forces can be set not only according to combinations of kinds of stylus holder and kinds of stylus but also according to measuring directions (upward direction and downward direction, for example) and angles of inclination of the main body, whereby the measuring force acting upon the measuring arm can be set to a proper value with higher accuracy.

In this case, the angle of inclination of the main body is automatically detected by the angle detecting means and need not be manually input by the operator, to thereby save the labor and time for manual inputting and hence further reduce the burden on the operator.

The surface-following type measuring machine may include measuring force detecting means for detecting the measuring force acting upon the measuring arm. In this case, the control means delivers the read command value of the measuring force to the measuring force adjusting means and controls the measuring force adjusting means such that a value of the measuring force detected by the measuring force detecting means becomes equal to the read command value of the measuring force.

With this arrangement, the measuring force adjusting means is controlled in response to the detected measuring force value such that the detected measuring force value becomes equal to the measuring force command value, whereby the measuring force acting upon the measuring arm can be further accurately set.

Preferably, the measuring force adjusting means comprises an actuator driven by the control means, and transmitting means connected between the actuator and the measuring arm, for transmitting an output of the actuator to the measuring arm.

The above and other objects, feature, and advantages of the invention will become more apparent from the following detailed description taken in conjunction with the accompanying drawings.

BRIEF DESCRIPTION OF THE DRAWINGS

FIG. 8 is a view showing a measuring force command value table; and

FIG. 9 is a block diagram showing the arrangement of a control system of a surface-following type measuring machine according to another embodiment of the present invention.

DETAILED DESCRIPTION OF PREFERRED EMBODIMENTS

The present invention will be described in detail with reference to the accompanying drawings showing preferred embodiments thereof.

Figure 1:
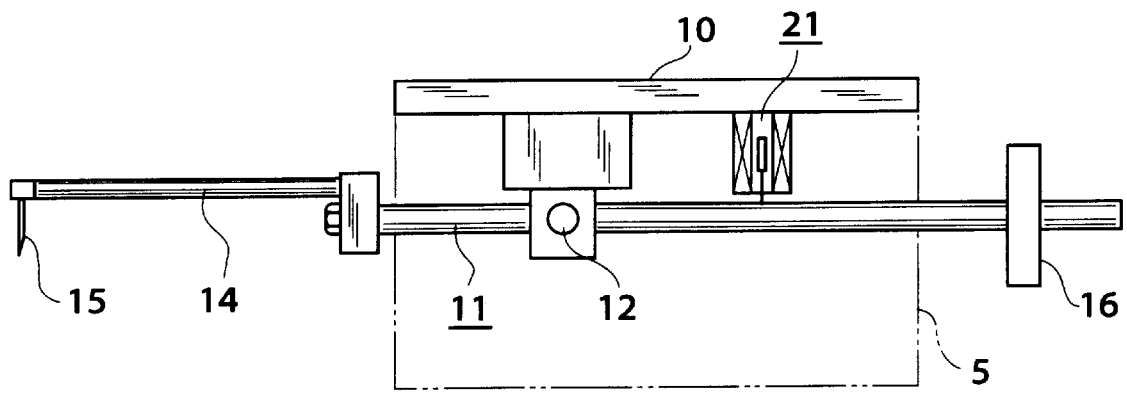
FIG. 1 is a view showing the construction of a detector of a conventional surface-following type measuring machine.
Figure 2:
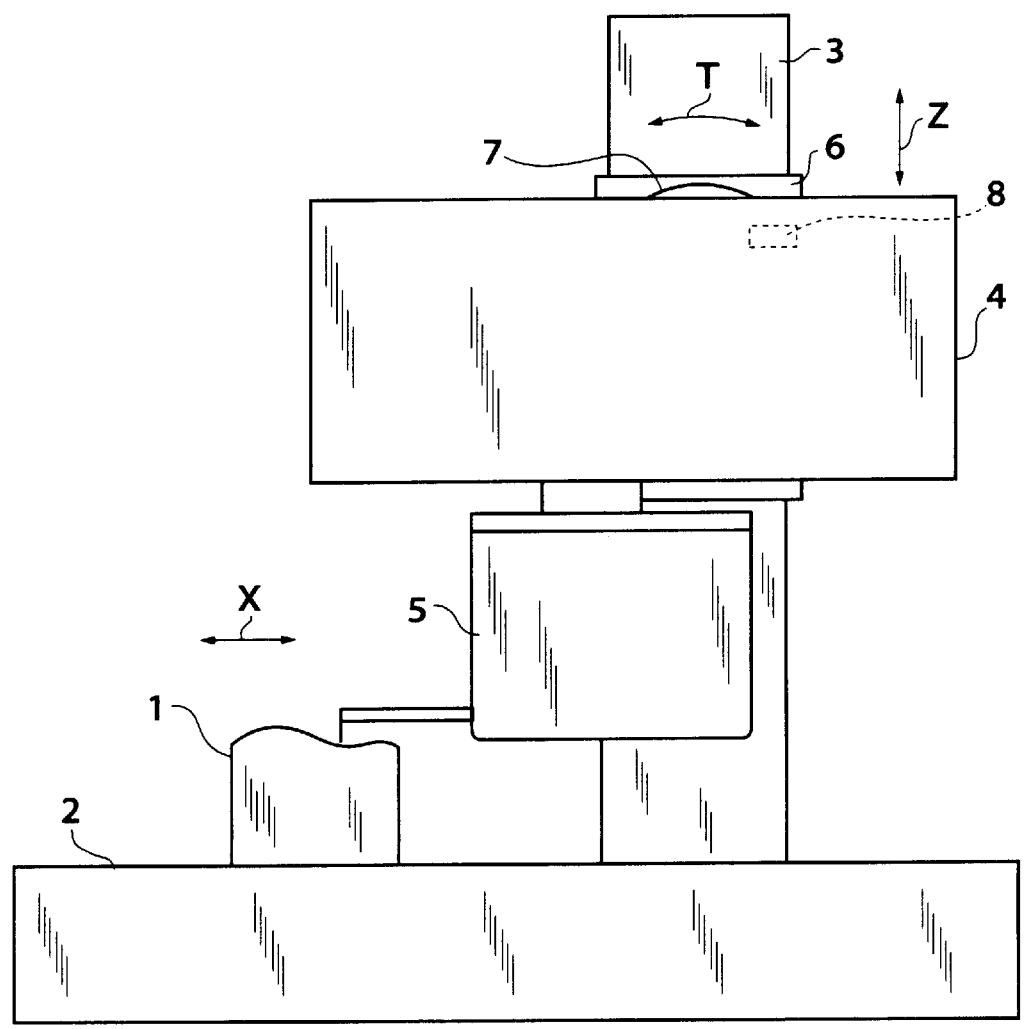
FIG. 2 is a front view showing the entire construction of a surface-following type measuring machine according to one embodiment of the present invention.

Referring first to FIG. 2, there is shown the entire construction of a surface-following type measuring machine according to one embodiment of the present invention. The surface-following type measuring machine according to the present embodiment is comprised of a measuring base 2 on which a workpiece 1 to be measured is placed, a column 3 erected on the measuring base 2, a slider 6 mounted on the column 3 for movement along the column 3 in a vertical direction (Z-axis direction) as indicated by an arrow Z. a detector feed 4 mounted on the slider 6 for tiling movement via a tilt device 7, and a detector 5 coupled to a bottom of the detector feed 4 for movement (normally in an X-axis direction as indicated by an arrow X) together with the detector feed 4. The tilt device 7 has a rotary shaft, not shown, which is mounted on the slider 6 in a fashion being projected from an outer peripheral surface thereof, and about which shaft the tilt device 7 is rotatable relative to the measuring base 2 in a direction parallel with the page space (in a direction indicated by an arrow T). The angle of rotation of the tilt device 7, i.e. the angle of inclination of the detector 5 is detected by an angle sensor 8p. The angle sensor 8 may be of a conventional type. For example, as is known from Laid-Open Japanese Patent Publication (Kokai) No.6-147894, the angle sensor 8 may be comprised of a housing, a pendulum supported within the housing for swinging motion, and an angle detector formed of a photoelectric element or the like, for detecting the inclination of the pendulum relative to the housing in terms of an electrical signal. Any other types of angle sensors may be employed.

Figure 3:
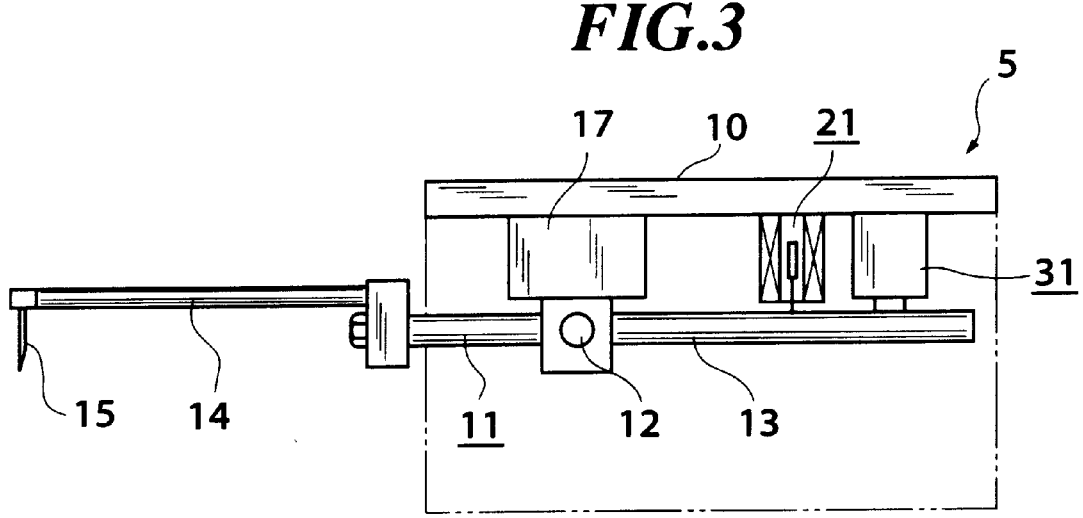
FIG. 3 is a view showing the construction of a detector of the surface-following type measuring machine according to the embodiment.

The detector 5 is constructed as shown in FIG. 3. The detector 5 is comprised of a frame 10 as a main body, which is connected to the detector feed 4, for movement relative to a workpiece to be measured, by the detector feed 4, a measuring arm 11 supported via a shaft 12 by the frame 10 for swinging about the shaft 12, a displacement detecting device 21 formed of a differential transformer or the like, supported by the frame 10 for detecting an amount of displacement of the measuring arm 11 during swinging, and a measuring force adjusting device 31 supported by the frame 10 for adjusting a measuring force acting upon the measuring arm 11.

The measuring arm 11 is comprised of a weight rod 13 supported by the frame 10 via the shaft 12 secured to a support member 17 fixed to an inner surface of the frame 10, for swinging about the shaft 12, a stylus holder 14 coupled to an end of the weight rod 13 in a manner being removable therefrom for exchange with another stylus holder, and a stylus 15 mounted on a tip of the stylus holder 14 in a manner being dismountable therefrom for exchange with another stylus.

Figure 4A:
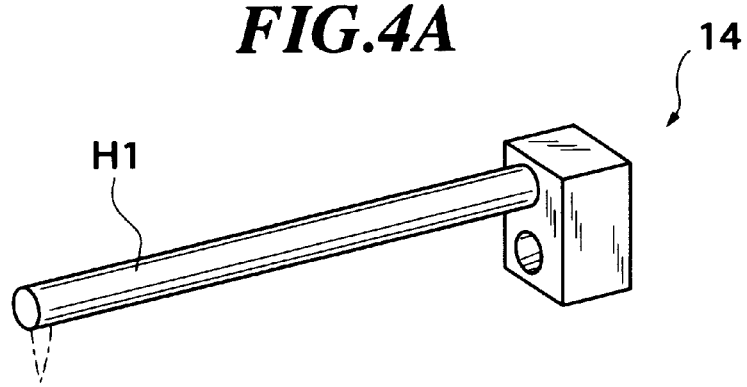
FIG. 4A is a perspective view showing a kind of stylus holder which can be used in the detector of FIG. 3.
Figure 4B:
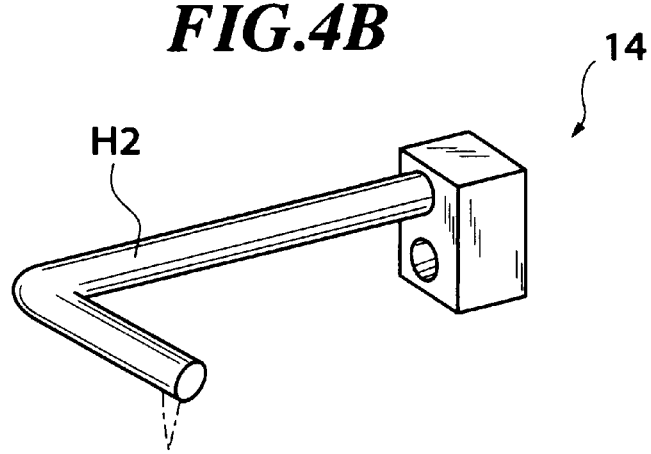
FIG. 4B is a perspective view showing another kind of stylus holder which can be used in the detector of FIG. 3.

As the stylus holder 14, there are provided a plurality of kinds of stylus holders. Out of the plurality of kinds of stylus holders, one suitable for the measuring surface of the workpiece 1 to be measured is selected and mounted on the weight rod 13. For example, a suitable stylus holder is selected from a plural kinds of stylus holders including a stylus holder H1 in the form of a straight pipe as shown in FIG. 4A, and an offset type stylus holder H2 in the form of an angled pipe with a tip thereof bent at right angles as shown in FIG. 4B.

Figure 5A:
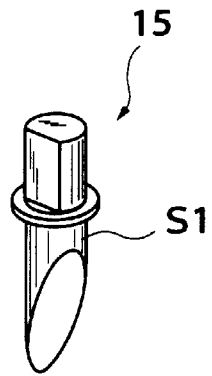
FIG. 5A is a perspective view showing a kind of stylus which can be used in the detector of FIG. 3.
Figure 5B:
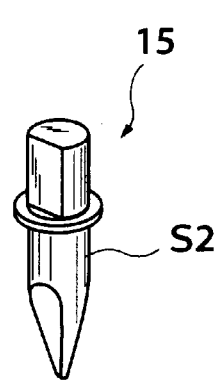
FIG. 5B is a perspective view showing another kind of stylus which can be used in the detector of FIG. 3.
Figure 5C:
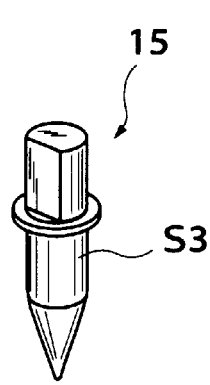
FIG. 5C is a perspective view showing a further kind of stylus which can be used in the detector of FIG. 3.

Also, as the stylus 15, there are provided a plurality of kinds of styluses. Out of the plurality of kinds of stylus, one suitable for the measuring surface of the workpiece 1 to be measured is selected and mounted on the stylus holder 14. For example, a suitable stylus is selected from a plurality of kinds of styluses including a one side-cut stylus S1 which has a tip thereof obliquely cut at one side as shown in FIG. 5A, a double side-cut stylus S2 which has a tip thereof obliquely cut at two sides as shown in FIG. 5B, and a conical stylus S3 which has a tip thereof conically cut as shown in FIG. 5C.

Figure 6:
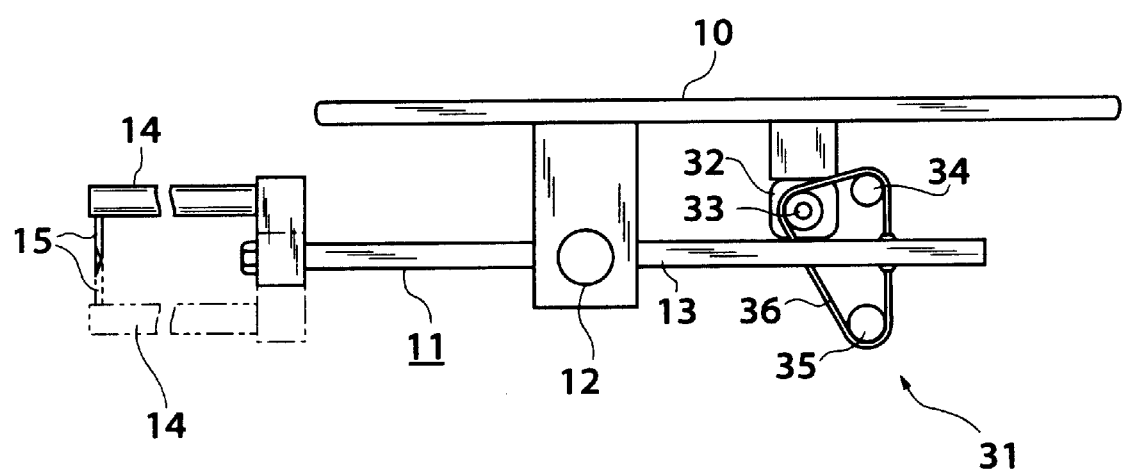
FIG. 6 is a view showing the construction of a measuring force adjusting device of the detector of FIG. 3.

The measuring force adjusting device 31 is so constructed as to apply a certain measuring force to the measuring arm 11. For example, as shown in FIG. 6, it is comprised of a rotative force generator 32 such as a rotary solenoid and a reversible motor, as an actuator, mounted on the inner surface of the frame 10, a driving pulley 33 secured on a main shaft of the rotative force generator 32, driven pulleys 34 and 35 arranged at both sides of the weight rod 13 of the measuring arm 11 and mounted on the frame 10 via a mounting plate, not shown, and a wire 36 wound around the pulleys 33, 34, and 35 with both ends thereof secured to lower and upper surfaces of the weight rod 13, respectively. The wire 36 and pulleys 33 to 35 form transmitting means.

When the rotative force generator 32 generates a rotative force for rotating the pulleys 33 to 35 in a counterclockwise direction as viewed in FIG. 6, the weight rod 13 is driven to pivotally move about the shaft 12 in the counterclockwise direction as viewed in FIG. 6 via the wire 36 to apply a downward measuring force to the measuring arm 11.

Conversely, when the rotative force generator 32 generates a rotative force for rotating the pulleys 33 to 35 in a clockwise direction as viewed in FIG. 6, the weight rod 13 is driven to pivotally move about the shaft 12 in the clockwise direction as viewed in FIG. 6 via the wire 36 to apply an upward measuring force to the measuring arm 11. In this case, the stylus holder 14 is mounted on the weight rod 13 in an inverted fashion with the stylus being directed upward, as indicated by two-dot chain lines in FIG. 6. That is, the mounting position of the stylus holder 14 or the measuring force-applying direction can be changed according to the measuring direction (measurement by an upward measuring force or measurement by a downward measuring force).

Figure 7:
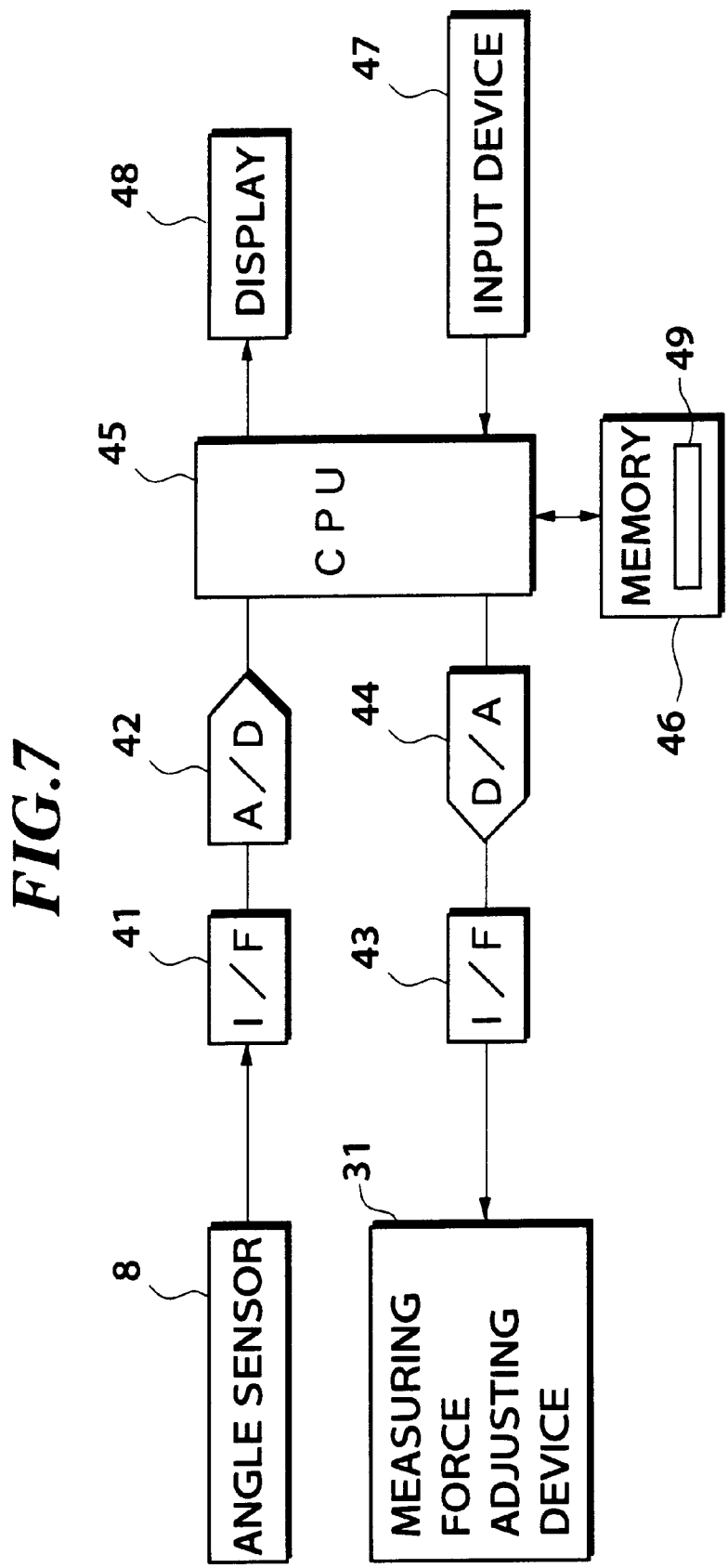
FIG. 7 is a block diagram showing the arrangement of a control system of the surface-following type measuring machine according to the embodiment.

FIG. 7 shows the arrangement of a control system of the surface-following type measuring machine according to the present embodiment, which sets and adjusts the measuring force. As shown in FIG. 7, the angle sensor 8 is connected to a CPU 45 as control means by way of an interface 41 and an A/D (analog-to-digital) converter 42. The measuring force adjusting device 31 is connected to the CPU 45 by way of an interface 43 and a D/A (digital-to-analog) converter 44.

Connected to the CPU 45 are a memory 46 as storage means, an input device 47 as designating means, and a display 48 as display means.

The memory 46 has storage areas for storing measurement data, etc., and a measuring force command value table 49. The measuring force command value table 49 has a data format as shown in FIG. 8. The table 49 contains measuring force command values $\alpha 1$, $\alpha 2$, $\alpha 3$, . . . that apply optimal measuring forces to the measuring arm 11 and are arranged correspondingly to various combinations of kinds (H1, H2) of the stylus holder 14, kinds (S1, S2, S3) of the stylus 15, measuring directions (measurement by an upward measuring force and measurement by a downward measuring force), and angles of inclination (0°, 15°, 45°, 60°, 75°) of the detector 5 (main body 10). The measuring force command values $\alpha 1$, $\alpha 2$, $\alpha 3$, . . . are electric current values for operating the rotative force generator 32.

For example, for a combination of the stylus holder H1 and the stylus S1, there are provided measuring force command values $\alpha 1$, . . . $\alpha 6$ which are optimal respectively for 0°, 15°, 45°, 60°, and 75° of the angle of inclination when the measuring direction is upward.

The operator can input through the input device 47 new appropriate measuring force command values for combinations of kinds of the stylus holder 14 and the stylus 15 to register them in the measuring force command value table 49. Further, the operator can suitably change measuring force command values already registered in the table 49 by inputting new values through the input device 47.

Besides, the operator can designate or select the measuring direction (upward direction or downward direction) as well as the kinds of stylus holder 14 and stylus to be used, through the input device 47, while looking at the screen of the display 48. An output signal indicative of the angle of inclination of the detector 5 (main body 10) from the angle sensor 8 is input through the interface 41 and the A/D converter 42 to the CPU 45.

The CPU 45 operates in response to a combination of a kind of the stylus holder 14 and a kind of the stylus 15, and a measuring direction (upward direction or downward direction), which have been designated through the input device 47 by the operator, and a value of the angle of inclination of the detector 5 (main body 10) from the angle sensor 8, to read a measuring force command value corresponding to the combination from the measuring force command value table 49 in the memory 46 and deliver the read command value to the measuring force adjusting device 31.

The operation of the present embodiment constructed as above will now be described.

In measuring, a kind of the stylus holder 14 and a kind of the stylus 15 which are optimal to the surface contour of a workpiece 1 to be measured are selected and mounted on the weight rod 13, and then the kind (H1 or H2) of the stylus holder 14 and the kind (S1, S2 or S3) of the stylus 15 are designated or input through the input device 47 together with a desired measuring direction (upward direction or downward direction).

The CPU 45 reads from the measuring force command value table 49 a measuring force command value corresponding to the combination of the kind (H1 or H2) of the stylus holder 14 and the kind (S1, S2 or S3) of stylus 15 and the measuring direction (upward direction or downward direction) which have been designated, and the detected value of angle of inclination from the angle detecting means 8, and delivers the read command value to the measuring force adjusting device 31.

Then, the rotative force generator 32 of the measuring force adjusting device 31 is driven in response to the measuring force command value delivered from the CPU 45 to control the measuring force acting upon the measuring arm 11 to a value corresponding to the command value.

Then, a measuring operation is carried out. With the stylus 15 disposed in contact with the surface of the workpiece 1 with a proper measuring force controlled as above, the detector feed 4 is operated to move the detector 5. That is, the stylus 15 is displaced upward and downward while following the surface of the workpiece 1, so that the measuring arm 11 swings. The amount of displacement of the measuring arm 11 during swinging is detected by the displacement detecting device 21. The surface roughness or contour of the workpiece 1 is determined from the detected amount of displacement.

As described above, according to the present embodiment, measuring force command values that apply optimal measuring forces to the measuring arm 11 are stored in the measuring force command value table 49, in a manner corresponding to various combinations of kinds (H1, H2) of the stylus holder 14, kinds (S1, S2, S3) of the stylus 15, measuring directions (upward direction and downward direction), and angles of inclination (0°, 15°, 45°, 60°, 75°) of the detector 5 (main body 10), and in measuring, one of the combinations is designated, and then a measuring force command value corresponding to the designated combination is read from the measuring force command value table 49 and delivered to the measuring force adjusting device 31. Thus, the measuring force can be automatically set to an optimal value. As a result, the measuring force can be set to a proper value in an efficient and accurate manner without imposing a burden on the operator.

Further, the angle of inclination of the detector 5 (main body 10) forming one parameter of the various combinations is automatically detected by the angle sensor 8 and need not be manually input by the operator. This can save the labor and time for manual inputting through the input device 47, and therefore can further reduce the burden on the operator.

Besides, a balance weight movable in the longitudinal direction of the measuring arm 11 as employed in the prior art need not be provided, and therefore the casing of the detector 5 has no outward projection, making the whole construction compact in size.

The present invention is not limited to the construction of the above described embodiment, but may be modified and varied without departing from the scope of the invention and insofar as the object of the invention can be attained.

For example, the measuring force adjusting device 31 is not limited to the one employed in the above described embodiment, but it may be comprised of a movable member, a linear guide, and a link, which form the transmitting means. The movable member is mounted on the frame 10 via the linear guide for vertical movement as viewed in FIG. 3 and coupled to the measuring arm 11 via the link. An actuator is provided to cause sliding movement of the movable member along the linear guide.

In this case, the actuator may be of any construction insofar as it can change the measuring force acting upon the measuring arm 11, such as a voice coil composed of a magnet and a coil, and a linear motor.

Further, in the above described embodiment the measuring force command value table 49 stores values of angle of inclination of the detector 5 (main body 10) at intervals of 15°. If the angle of inclination detected by the angle sensor 8 falls between adjacent stored values, a measuring force command value may be obtained by an interpolation method, for example, by calculating the same by means of a proportional calculation based upon command values corresponding to the adjacent stored values of angle of inclination.

In addition, a measuring force command value once read from the measuring force command value table 49 may be suitably varied or adjusted through operation of the input device by the operator. This can prevent a workpiece formed of a relatively soft material from being scarred or hurt by setting the measuring force command value to a smaller value.

Although in the above described embodiment the measuring force command value is merely delivered to the measuring force adjusting device 31, alternatively it may be so arranged that the measuring force acting upon the measuring arm 11 is detected, and the detected measuring force value is delivered to the CPU 45, which in turn controls the measuring force adjusting device 31 in response to the detected measuring force value such that the detected measuring force value becomes equal to the measuring force command value, whereby the measuring force acting upon the measuring arm 11 can be further accurately set. More specifically, as shown in FIG. 9, a strain gauge 51 as measuring force detecting means is connected to the CPU 45 by way of an interface 52 and an A/D converter 53. The strain gauge 51 is constructed as disclosed by Japanese Laid-Open Patent Publication (Kokai) No. 5-332859, for example. That is, it is comprised of four strain gauge elements which are connected so as to form two bridge circuits, the sum of outputs of which indicates the detected measuring force. The four strain gauge elements are mounted on the outer peripheral surface of the stylus holder 4 in a circumferential arrangement. The CPU 45 controls in response to the output of the strain gauge 51 the measuring force adjusting device 31 such that the output value of the strain gauge 51 becomes equal to a measuring force command value read from the measuring force command value table 49.

As described above, according to the surface-following type measuring machine of the present invention, a measuring force command value table stores a plurality of measuring force command values that apply optimal measuring forces to a measuring arm, in a manner corresponding to combinations of kinds of a stylus holder and kinds of a stylus, and in measuring, when one of the combinations is designated, a measuring force command value is read from the table, and delivered to measuring force adjusting means. Thus, an optimal measuring force can be automatically set. As a result, the measuring force can be set to a proper value in an efficient and accurate manner without imposing a burden on the operator.

What is claimed is:

1. A surface-following type measuring machine comprising:

a main body disposed for movement relative to an object to be measured;

a measuring arm supported by said main body for displacement relative thereto, said measuring arm carrying at one end thereof a stylus holder and a stylus in a manner permitting replacement of said stylus holder and said stylus;

displacement detecting means for detecting displacement of said measuring arm;

measuring force adjusting means for adjusting a measuring force acting upon said measuring arm;

storage means storing a measuring force command value table having a plurality of command values of said measuring force corresponding respectively to combinations of plural kinds of said stylus holder and plural kinds of said stylus;

designating means for designating a kind of said stylus holder and a kind of said stylus after replacement of at least one of said stylus holder and said stylus; and control means for reading a command value of said measuring force corresponding to a combination of said kind of said stylus holder and said kind of said stylus after replacement designated by said designating means, and delivering the read command value of said measuring force to said measuring force adjusting means.

2. The surface-following type measuring machine as claimed in claim 1, including measuring force detecting means for detecting said measuring force acting upon said measuring arm, and wherein said control means delivers the read command value of said measuring force to said measuring force adjusting means and controls said measuring force adjusting means such that a value of said measuring force detected by said measuring force detecting means becomes equal to the read command value of said measuring force.

3. The surface-following type measuring machine as claimed in claim 1, wherein said measuring force adjusting means comprises an actuator driven by said control means, and transmitting means connected between said actuator and said measuring arm, for transmitting an output of said actuator to said measuring arm.

4. A surface-following type measuring machine comprising:

a main body disposed for movement relative to an object to be measured;

a measuring arm supported by said main body for displacement relative thereto, said measuring arm carrying at one end thereof a stylus holder and a stylus in a manner permitting replacement of said stylus holder and said stylus;

displacement detecting means for detecting displacement of said measuring arm;

measuring force adjusting means for adjusting a measuring force acting upon said measuring arm;

storage means storing a measuring force command value table having a plurality of command values of said measuring force corresponding respectively to combinations of plural kinds of said stylus holder, plural kinds of said stylus, measuring directions in which said objected is to be measured, and angles of inclination of said main body;

angle detecting means for detecting an angle of inclination of said main body;

designating means for designating a kind of said stylus holder and a kind of said stylus after replacement of at least one of said stylus holder and said stylus, and for designating a measuring direction in which said objected is to be measured; and control means for reading a command value of said measuring force corresponding to a combination of said kind of said stylus holder and said kind of said stylus after replacement designated by said designating means, said measuring direction designated by said designating means, and said angle of inclination of said main body detected by said angle detecting means, and delivering the read command value of said measuring force to said measuring force adjusting means.

5. The surface-following type measuring machine as claimed in claim 4, including measuring force detecting means for detecting said measuring force acting upon said measuring arm, and wherein said control means delivers the read command value of said measuring force to said measuring force adjusting means and controls said measuring force adjusting means such that a value of said measuring force detected by said measuring force detecting means becomes equal to the read command value of said measuring force.

6. The surface-following type measuring machine as claimed in claim 4, wherein said measuring force adjusting means comprises an actuator driven by said control means, and transmitting means connected between said actuator and said measuring arm, for transmitting an output of said actuator to said measuring arm.

* * * * *